(12) United States Patent
Wakelam et al.

(10) Patent No.: US 11,298,716 B2
(45) Date of Patent: *Apr. 12, 2022

(54) FLOW DIRECTING SYSTEM AND METHOD FOR ADDITIVE MANUFACTURING SYSTEM

(71) Applicant: General Electric Company, Schenectady, NY (US)

(72) Inventors: Christian Thomas Wakelam, Munich (DE); Rene du Cauze de Nazelle, Garching (DE)

(73) Assignee: General Electric Company, Schenectady, NY (US)

( * ) Notice: Subject to any disclaimer, the term of this patent is extended or adjusted under 35 U.S.C. 154(b) by 541 days.

This patent is subject to a terminal disclaimer.

(21) Appl. No.: 16/107,709

(22) Filed: Aug. 21, 2018

(65) Prior Publication Data
US 2020/0061655 A1 Feb. 27, 2020

(51) Int. Cl.
*B05B 12/32* (2018.01)
*B29C 64/153* (2017.01)
(Continued)

(52) U.S. Cl.
CPC .............. *B05B 12/32* (2018.02); *B05B 7/08* (2013.01); *B05B 12/006* (2013.01);
(Continued)

(58) Field of Classification Search
CPC .............. B22F 2201/00; B22F 2201/10; B22F 2201/11; B22F 10/20; B29C 64/153;
(Continued)

(56) References Cited

U.S. PATENT DOCUMENTS

| 7,979,152 B2 | 7/2011 | Davidson |
| 8,017,055 B2 * | 9/2011 | Davidson ................ B22F 10/10 |
| | | 264/308 |

(Continued)

FOREIGN PATENT DOCUMENTS

| CN | 105451970 A | 3/2016 |
| DE | 192914295875 A1 | 1/2015 |

(Continued)

OTHER PUBLICATIONS

Ladewig, Alexander, et al.; "Influence of the shielding gas flow on the removal of process by-products in the selective laser melting process", Additive Manufacturing, vol. 10, pp. 1-9, Apr. 2016.

(Continued)

*Primary Examiner* — Nahida Sultana
*Assistant Examiner* — Jamel M Nelson
(74) *Attorney, Agent, or Firm* — Dority & Manning, P.A.

(57) ABSTRACT

An additive manufacturing (AM) system includes a housing defining a chamber, a build platform disposed within the chamber, and an upper gas inlet configured to supply an upper gas flow in a first direction parallel to the build platform. The AM system includes a lower gas inlet disposed in the chamber and configured to supply a lower gas flow in a second direction toward a bottom wall of the chamber, and a flow directing system configured to receive the lower gas flow and redirect the lower gas flow in the first direction parallel to the build platform. The AM system includes one or more gas delivery devices fluidly coupled to the upper and lower gas inlets and configured to regulate one or more flow characteristics of the upper and lower gas flows and a gas outlet configured to discharge the upper and lower gas flows from the chamber.

17 Claims, 5 Drawing Sheets

(51) Int. Cl.
*B29C 64/245* (2017.01)
*B29C 64/371* (2017.01)
*B05B 7/08* (2006.01)
*B05B 12/00* (2018.01)
*B05B 12/08* (2006.01)
*B22F 10/20* (2021.01)
*B33Y 10/00* (2015.01)
*B33Y 30/00* (2015.01)
*B33Y 40/00* (2020.01)

(52) U.S. Cl.
CPC ............ *B05B 12/087* (2013.01); *B22F 10/20* (2021.01); *B29C 64/153* (2017.08); *B29C 64/245* (2017.08); *B29C 64/371* (2017.08); *B22F 2201/11* (2013.01); *B33Y 10/00* (2014.12); *B33Y 30/00* (2014.12); *B33Y 40/00* (2014.12)

(58) Field of Classification Search
CPC ..... B29C 64/245; B29C 64/25; B29C 64/364; B29C 64/371; B05B 12/32; B05B 12/087; B05B 12/006; B05B 7/08
See application file for complete search history.

(56) References Cited

U.S. PATENT DOCUMENTS

| | | | |
|---|---|---|---|
| 10,682,700 | B2 | 6/2020 | Nyrhila et al. |
| 11,014,304 | B2* | 5/2021 | Wakelam ............... B29C 64/153 |
| 2016/0114531 | A1* | 4/2016 | Chuang .................. B33Y 30/00 264/497 |
| 2016/0200052 | A1 | 7/2016 | Moore et al. |
| 2017/0216916 | A1 | 3/2017 | Nyrhila et al. |
| 2017/0232670 | A1 | 8/2017 | Joerger et al. |
| 2018/0071977 | A1 | 3/2018 | Tumbleston et al. |
| 2018/0126460 | A1* | 5/2018 | Murphree ............... B22F 10/20 |
| 2018/0126650 | A1 | 5/2018 | Murphree et al. |
| 2019/0262901 | A1 | 8/2019 | Huebinger et al. |

FOREIGN PATENT DOCUMENTS

| | | | | |
|---|---|---|---|---|
| DE | 102014000022 A1 * | 7/2015 | ........... | B29C 64/153 |
| EP | 3321003 A1 | 5/2018 | | |
| KR | 101760832 B1 * | 7/2017 | | |

OTHER PUBLICATIONS

International Search Report/Written Opinion; PCT/US19/047455, dated Nov. 4, 2019; 11 pages.

* cited by examiner

FLOW DIRECTING SYSTEM AND METHOD FOR ADDITIVE MANUFACTURING SYSTEM

BACKGROUND

The subject matter disclosed herein generally relates to an additive manufacturing system and method, and more specifically, to a Direct Laser Sintering (DLS) or Direct Laser Melting (DLM) system and method that employs focused energy to selectively fuse a powder material to produce an object.

Additive manufacturing (AM) processes generally involve the buildup of one or more materials to make a net or near-net shape object, in contrast to subtractive manufacturing methods, which selectively remove material from an initial form to fabricate an object. Though "additive manufacturing" is an industry standard term (ASTM F2792), it encompasses various manufacturing and prototyping techniques known under a variety of names, including freeform fabrication, 3D printing, and rapid prototyping/tooling. A particular type of AM process uses a focused energy source (e.g., an electron beam, a laser beam) to sinter or melt a powder material deposited on a build platform within a chamber, creating a solid three-dimensional object in which particles of the powder material are bonded together.

Laser sintering/melting, as used in Direct Laser Sintering (DLS) and/or Direct Laser Melting (DLM), is a common industry term used to refer to a method of producing three-dimensional (3D) objects by using a laser beam to sinter or melt a fine powder. In particular, laser sintering/melting techniques often entail projecting a laser beam onto a controlled amount of powder (e.g., a powder bed) on a substrate, so as to form a layer of fused particles or molten material thereon. When the laser beam interacts with the powder at a powder bed, smoke and/or a particulate matter (e.g., condensate, spatter) is produced within the chamber. The smoke and/or the particular matter may be detrimental to the quality of the resulting object. As an example, the suspended smoke and/or particular matter within the chamber can interfere with the laser beam and reduce the energy or intensity of the laser beam before it reaches the powder bed. As another example, the smoke and/or the particular matter may deposit onto the powder bed and may become incorporated into the resulting object.

In certain laser sintering/melting (or DLS/DLM) systems, a gas flow is introduced in an upper portion of the chamber (e.g., toward the top of the chamber in the z-direction and away from the build platform) to flow generally parallel to the build platform in an effort to remove the smoke and/or particulate matter and prevent deposition. However, this upper gas flow may not efficiently remove the smoke and/or particulate matter in the lower portion of the chamber (e.g., toward the build platform and away from the top of the chamber in the z-direction). Accordingly, particulate matter may become trapped or deposited within the lower portion of the chamber, which can lower the quality of the resulting object of the DLS/DLM processes.

BRIEF DESCRIPTION

In one embodiment, an additive manufacturing system includes a housing defining a chamber, a build platform disposed in a lower portion of the chamber, and an upper gas inlet disposed in a first side wall of the chamber. The upper gas inlet is configured to supply an upper gas flow in a first direction parallel to the build platform. The additive manufacturing system includes a lower gas inlet disposed in the chamber and configured to supply a lower gas flow in a second direction at least initially toward a bottom wall of the chamber. The additive manufacturing system also includes a flow directing system disposed near the bottom wall and configured to receive the lower gas flow, where the flow directing system redirects the lower gas flow in the first direction parallel to the build platform. The additive manufacturing system further includes one or more gas delivery devices fluidly coupled to the upper and lower gas inlets and configured to regulate one or more flow characteristics of the upper and lower gas flows and a gas outlet disposed in a second side wall of the chamber, where the gas outlet is configured to discharge the upper and lower gas flows from the chamber.

In another embodiment, a method of operating an additive manufacturing system includes depositing a bed of a powder material on a build platform within a chamber, supplying an upper gas flow into the chamber horizontally above the build platform, and supplying a lower gas flow into the chamber in a first direction nonparallel to the build platform and toward a flow directing system disposed proximate a bottom wall of the chamber. The method also includes redirecting the lower gas flow in a second direction parallel to the build platform toward the build platform via the flow directing system, and applying a focused energy beam to at least a portion of the bed of the powder material deposited on the build platform to form a solidified layer while supplying the upper gas flow, and supplying and redirecting the lower gas flow.

In another embodiment, an additive manufacturing system includes a housing defining a chamber, a build platform disposed in the chamber, and a powder application device configured to translate relative to the build platform and deposit a bed of powder material on the build platform. The additive manufacturing system also includes an upper gas inlet disposed in a first side wall of the chamber above the build platform, where the upper gas inlet is configured to supply an upper gas flow in a first direction parallel to the build platform. The additive manufacturing system also includes a lower gas inlet in the chamber configured to supply a lower gas flow in a second direction toward the powder application device. The powder application device includes a flow directing element configured to receive the lower gas flow and redirect the lower gas flow in the first direction parallel to the build platform. The additive manufacturing system also includes one or more gas delivery devices fluidly coupled to the upper and lower gas inlets and configured to regulate one or more flow characteristics of the upper and lower gas flows and a gas outlet disposed in a second side wall of the chamber, wherein the gas outlet is configured to discharge the upper and lower gas flows from the chamber.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Figure 1:
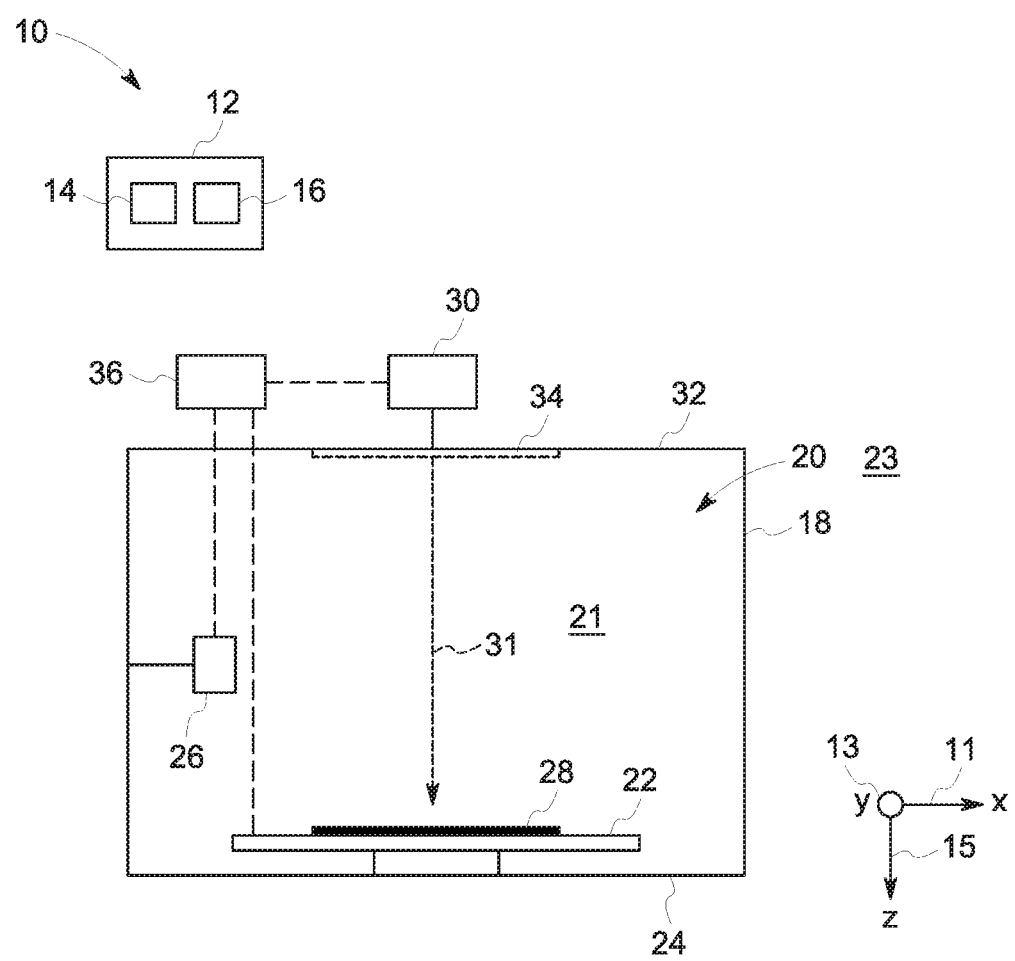
FIG. 1 is a schematic diagram of an embodiment of an additive manufacturing (AM) system having a manufacturing chamber, in accordance with present embodiments.

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

In the following specification and the claims, the singular forms "a", "an" and "the" include plural referents unless the context clearly dictates otherwise. As used herein, the term "or" is not meant to be exclusive and refers to at least one of the referenced components being present and includes instances in which a combination of the referenced components may be present, unless the context clearly dictates otherwise. The term "uniform gas flow", as used herein, means that the flow velocity of a gas flow does not significantly vary across a width of the gas flow and/or a length of the gas flow. As used herein, the term "additive manufacturing" or AM, relates to any suitable laser sintering/melting additive manufacturing technique, including, but not limited to: Direct Metal Laser Melting, Direct Metal Laser Sintering, Direct Metal Laser Deposition, Laser Engineered Net Shaping, Selective Laser Sintering, Selective Laser Melting, Selective Heat Sintering, Fused Deposition Modeling, Hybrid Systems, or combinations thereof.

The present disclosure generally encompasses systems and methods for fabricating objects using a laser sintering/melting-based method of additive manufacturing. As noted above, for such additive manufacturing techniques, when the laser beam sinters or melts the powder bed within an enclosed manufacturing chamber, smoke and/or particulate matter (e.g., condensate, spatter) can accumulate within the chamber. As mentioned, this smoke and/or the particulate matter may interact with the laser beam and/or the object being printed and interfere with the fabrication process. As such, it may be desirable to remove the smoke and/or the particulate matter from the chamber to improve the manufacturing process and/or the quality of the resulting object.

As discussed in detail below, some embodiments of the present disclosure include additive manufacturing (AM) systems and methods that employ a combination of an upper gas flow in an upper portion of the chamber and a lower gas flow in a lower portion of the chamber, where the lower gas flow is generally directed substantially parallel to a build platform of the chamber. More specifically, a flow directing system of the AM system generally guides the lower gas flow from a lower gas inlet toward the build platform and in the direction substantially parallel to the build platform. The addition of the lower gas flow may advantageously overcome the above noted shortcomings of an AM system having only the upper gas flow by more efficiently removing the smoke and/or particulate matter from the chamber, as well as suppressing recirculation of the smoke and/or the particulate matter inside the chamber of the AM system. As such, the accumulation and/or deposition of the smoke and/or particulate matter on various locations inside the chamber may be substantially reduced or eliminated, and thus may lead to improved quality of the resulting object of the AM process. In some embodiments, the lower gas flow may include multiple streams having different flow characteristics. The flow characteristics may include flow distribution, flow rate (e.g., mass flow rate, volume flow rate), flow velocity (e.g., in meters per second (m/s)), flow direction or angle, flow temperature, or any combination thereof. The flow velocities and/or other flow characteristics of the multiple streams may be controlled or tuned to desirable levels to substantially remove the smoke and/or particulate matter from within the chamber.

FIG. 1 illustrates an example embodiment of an AM system 10 (e.g., a laser sintering/melting AM system 10) for producing an article or object using a focused energy source (e.g., a laser) or beam. To facilitate discussion, the AM system 10 and its components will be described with reference to an x-axis or direction 11, a y-axis or direction 13, and a z-axis or direction 15. In the illustrated embodiment, the AM system 10 includes a controller 12 having memory circuitry 14 that stores instructions (e.g., software, applications), as well as processing circuitry 16 configured to execute these instructions to control various components of the AM system 10. The AM system 10 includes a housing 18 defining a manufacturing chamber 20 (also referred to herein as chamber 20) that defines an interior volume 21. The chamber 20 is sealed to contain an inert atmosphere and to protect the build process from an ambient atmosphere 23 outside of the chamber 20. The AM system 10 includes a build platform 22 disposed inside the chamber 20 on a base portion or bottom wall 24 of the housing 18. Accordingly, the illustrated build platform 22 is oriented substantially parallel to the bottom wall 24 of the housing 18. For example, an angle between the build platform 22 and the bottom wall 24 may be less than 5 degrees (°), less than 3°, or less than 1°. In some embodiments, the build platform 22 may have a working area (e.g., the top surface of the build platform 22) in a range between about 0.01 square meters ($m^2$) and about 1.5 $m^2$. The article or object of the AM process is fabricated on the build platform 22, as discussed below.

The AM system 10 includes a powder application device 26, which may be arranged inside the chamber 20 to repeatedly deposit a quantity (e.g., a layer or bed) of a powder material onto the build platform 22. A time period throughout which the powder application device 26 deposits the powder material onto the build platform 22 will be referred to herein as a deposition period of the powder application device 26. As described in greater detail herein, the powder application device 26 may be disposed in a resting position, adjacent the build platform 22, between successive deposition periods of the powder application device 26. The powder material deposited on the build platform 22 generally forms a powder bed 28. The powder material may include, but is not limited to, polymers, plastics, metals, ceramics, sand, glass, waxes, fibers, biological matter, composites, or hybrids of these materials. These materials may be used in a variety of forms as appropriate for a given material and method, including, for example, solids, powders, sheets, foils, tapes, filaments, pellets, wires, atomized, and combinations of these forms.

The AM system 10 includes an energy generating system 30, which may be arranged inside or outside the chamber 20 for generating and selectively directing a focused energy beam 31, such as laser, onto at least a portion of the powder bed 28 disposed on the build platform 22. For the embodiment illustrated in FIG. 1, the energy generating system 30 is arranged outside the chamber 20 in proximity to a top portion or a top wall 32 of the housing 18, opposite to the base portion or the bottom wall 24. The focused energy beam 31 enters the chamber 20 through a window 34 disposed within the top wall 32. The powder bed 28 disposed on the build platform 22 is subjected to the focused energy beam 31 in a selective manner as controlled by the controller 12, depending on the desired geometry of the article. In some embodiments, the energy generating system 30 includes a focused energy source for generating the focused energy beam 31. In some embodiments, the focused energy source includes a laser source and the focused energy beam 31 is a laser beam. In some embodiments, the laser source includes a pulsed laser source that generates a pulsed laser beam. The pulsed laser beam is not emitted continuously, in contrast with a continuous laser radiation, but is emitted in a pulsed manner e.g., in time limited pulses with interval. In some embodiments, the energy generating system 30 includes a plurality of focused energy sources that is configured to selectively irradiate the powder bed 28 using the focused energy beam 31.

The AM system 10 includes a positioning system 36 (e.g., a gantry or other suitable positioning system), which may be arranged inside the chamber 20. The positioning system 36 may be any multidimensional positioning system, such as a delta robot, cable robot, robot arm, or another suitable positioning system. The positioning system 36 may be operatively coupled to the powder application device 26, the energy generating system 30, the build platform 22, or a combination thereof. The positioning system 36 may move the powder application device 26, the energy generating system 30, the build platform 22, or a combination thereof, relatively to one another, in any of the x-, y-, and z-directions 11, 13, 15, or a combination thereof.

The AM system 10 is further configured to supply an upper gas flow and a lower gas flow into the chamber 20, as well as discharge a gas flow from the chamber 20, as will be discussed in FIG. 2. The gas flow being discharged or exhausted from the chamber 20 includes the upper gas flow, the lower gas flow, as well as a substantial portion of any smoke and/or particulate matter that is generated on application of the focused energy beam 31 to selectively melt or sinter the powder bed 28 during formation of the desired article. By employing a combination of the upper and lower gas flows, as set forth herein, recirculation of the smoke and/or particulate matter within the chamber may be substantially reduced or eliminated, thus substantially improving the quality of the build process and/or the article being printed.

Figure 2:
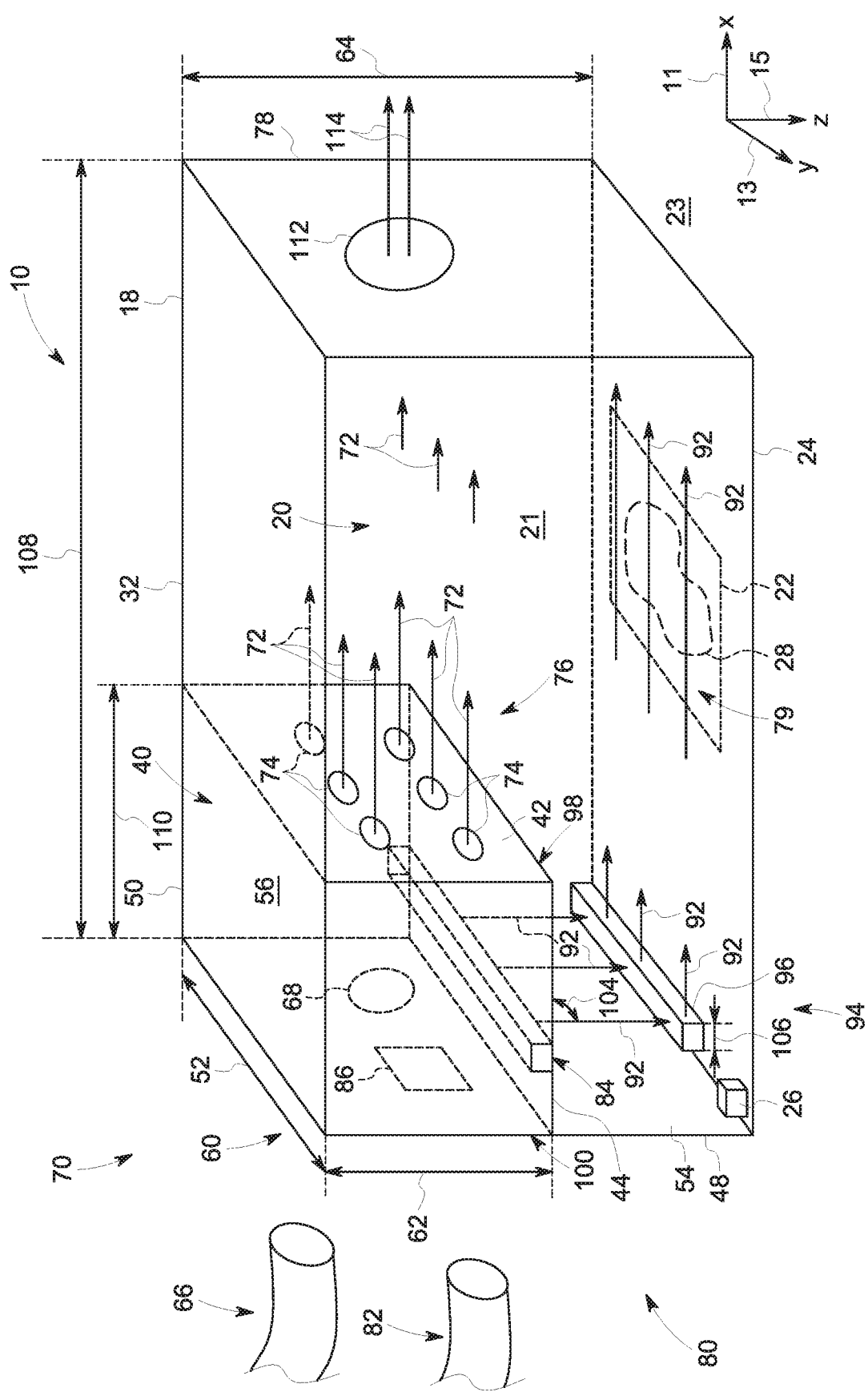
FIG. 2 is a schematic perspective view illustrating an embodiment of the manufacturing chamber of the AM system of FIG. 1 having both an upper gas flow arrangement, as well as a lower gas flow arrangement having a flow directing system configured to guide the lower gas flow, in accordance with present embodiments.

FIG. 2 is a schematic perspective view illustrating an embodiment of the chamber 20 of the AM system 10, in accordance with the present approach. As illustrated, the AM system 10 includes a plenum 40 that is defined by a plenum side wall 42 and a plenum dividing wall 44, which each extend in the y-direction 13 from a side wall 48 to a side wall 50 of the housing 18, along an entire width 52 of the chamber 20. Accordingly, the plenum dividing wall 44 and the plenum side wall 42 enclose portion of the interior volume 21 of the chamber 20 between a rear wall 54 and the top wall 32 of the chamber 20. The enclosed volume is separate from the remaining volume of the chamber 20, and will be referred to herein as a plenum chamber 56. In the illustrated embodiment, the plenum chamber 56 is disposed within an upper portion 60 of the chamber 20, which includes any portion, or portions of the chamber 20 disposed vertically above (e.g., with respect to the z-direction 15) the plenum dividing wall 44. For example, in some embodiments, a height 62 of the plenum 40 (e.g., a distance between the top wall 32 and the plenum dividing wall 44) may include 40%, 50%, 60%, or 70%, of a total height 64 of the chamber 20. Accordingly, the upper portion 60 of the chamber 20 may include an upper 40%, upper 50%, upper 60%, or an upper 70% of the chamber 20, depending on the vertical position of the plenum dividing wall 44 in different embodiments.

In the illustrated embodiment, the plenum chamber 56 is fluidly coupled to an upper gas delivery device 66 via an aperture 68 defined within the rear wall 54 of the housing 18. As shown in the illustrated embodiment, the aperture 68 is defined within a portion of the rear wall 54 that is vertically above the plenum dividing wall 44. The upper gas delivery device 66 may be coupled to a gas supply line or any other suitable gas source, which enables the upper gas delivery device 66 to supply a gas flow to the plenum chamber 56 and, in some cases, pressurize the plenum chamber 56 (e.g., with respect to an ambient pressure within the chamber 20). As described in greater detail herein, the upper gas delivery device 66 may include one or more suitable conveying devices and/or flow generating devices such as, one or more fluid valves, one or more pumps or blowers, or a combination thereof, which generate and/or regulate a flow rate and/or pressure of the gas flow entering the plenum chamber 56. The upper gas delivery device 66 and the plenum 40 collectively form an upper gas delivery system 70, which is configured to supply an upper gas flow 72 into the chamber 20.

For example, as illustrated, the plenum 40 includes a plurality of openings 74 defined within the plenum side wall 42, which collectively define an upper gas inlet 76 into the chamber 20. The plurality of openings 74 thus enable pressurized gas within the plenum chamber 56 to flow through the plenum side wall 42 and into the chamber 20. The plurality of openings 74 may include an array of openings that enable the upper gas flow 72 to flow substantially uniformly along the x-direction 11 (e.g., a first direction substantially parallel to a top surface 79 of the build platform 22, generally perpendicular to the z-direction 15). In other words, the upper gas flow 72 is directed horizontally across the build platform 22. It should be noted that the term "horizontally" used herein refers to directions that are parallel to the x-axis 11, or directions that are substantially parallel to the x-axis 11 (e.g., at a tolerance of ±10 degrees relative to the x-axis 11). The plurality of openings 74 may be sized to regulate certain flow characteristics of the upper gas flow 72, such as a flow distribution, a flow rate (e.g., a mass flow rate, a volumetric flow rate), a flow velocity (e.g., in meters per second (m/s)), a flow direction or angle, or any combination thereof. For example, in some embodiments, the plurality of openings 74 may be sized to facilitate substantially laminar flow of the upper gas flow 72 along the upper portion 60 of the chamber 20. In certain embodiments, the plurality of openings 74 may be in the form of circular holes, as illustrated in FIG. 2. However, in other embodiments, the plurality of openings 74 may be arranged and shaped in a honeycomb-like structure, a sponge-like structure, or any other suitable geometric arrangement to facilitate generating the desired flow characteristics of the upper gas flow 72. In yet further embodiments, the plurality of openings 74 may include a single opening that, for example, extends along a portion of the width 52, or substantially all of the width 52 of the chamber 20.

It should be noted that although the upper gas inlet 76 is defined within the plenum side wall 42 in the illustrated embodiment shown in FIG. 2, in other embodiments, the upper gas inlet 76 may be defined within any other suitable portion of the chamber 20 or portions of the chamber 20. For example, in some embodiments, the plurality of openings 74 is defined within the top wall 32, the side wall 48, the side wall 50, a front wall 78 of the housing 18, or a combination thereof, in addition to, or in lieu of, the plenum side wall 42. Accordingly, in certain embodiments, the upper gas inlet 76 may supply the upper gas flow 74 into the chamber 20 at an angle relative to the x-direction 11. In such embodiments, the AM system 10 may include one or more flow directing elements that are disposed within the upper portion 60 chamber 20 and configured to receive the upper gas flow 74 from the plurality of openings 74 and redirect the upper gas flow 74 in a direction generally parallel to the x-direction 11. The flow directing elements may include one or more winglets, one or more airfoils, or any other suitable flow directing system configured (e.g., shaped, oriented) to redirect a flow direction of the upper gas flow 74. In certain embodiments, the plenum 40 may be omitted from the AM system 10, such that the plurality of openings 74 is defined within the rear wall 54 of the housing 18, rather than the plenum side wall 42 of the plenum 40. In such embodiments, the upper gas delivery device 66 may be fluidly coupled directly to the plurality of openings 74, thereby enabling supply of the upper gas flow 74 through the plurality of openings 74. As described in greater detail herein, in yet further embodiments of the AM system 10, the upper gas delivery system 72 may be omitted from the AM system 10 entirely. In such embodiments, the AM system 10 does not include the upper gas flow 74.

Figure 3:
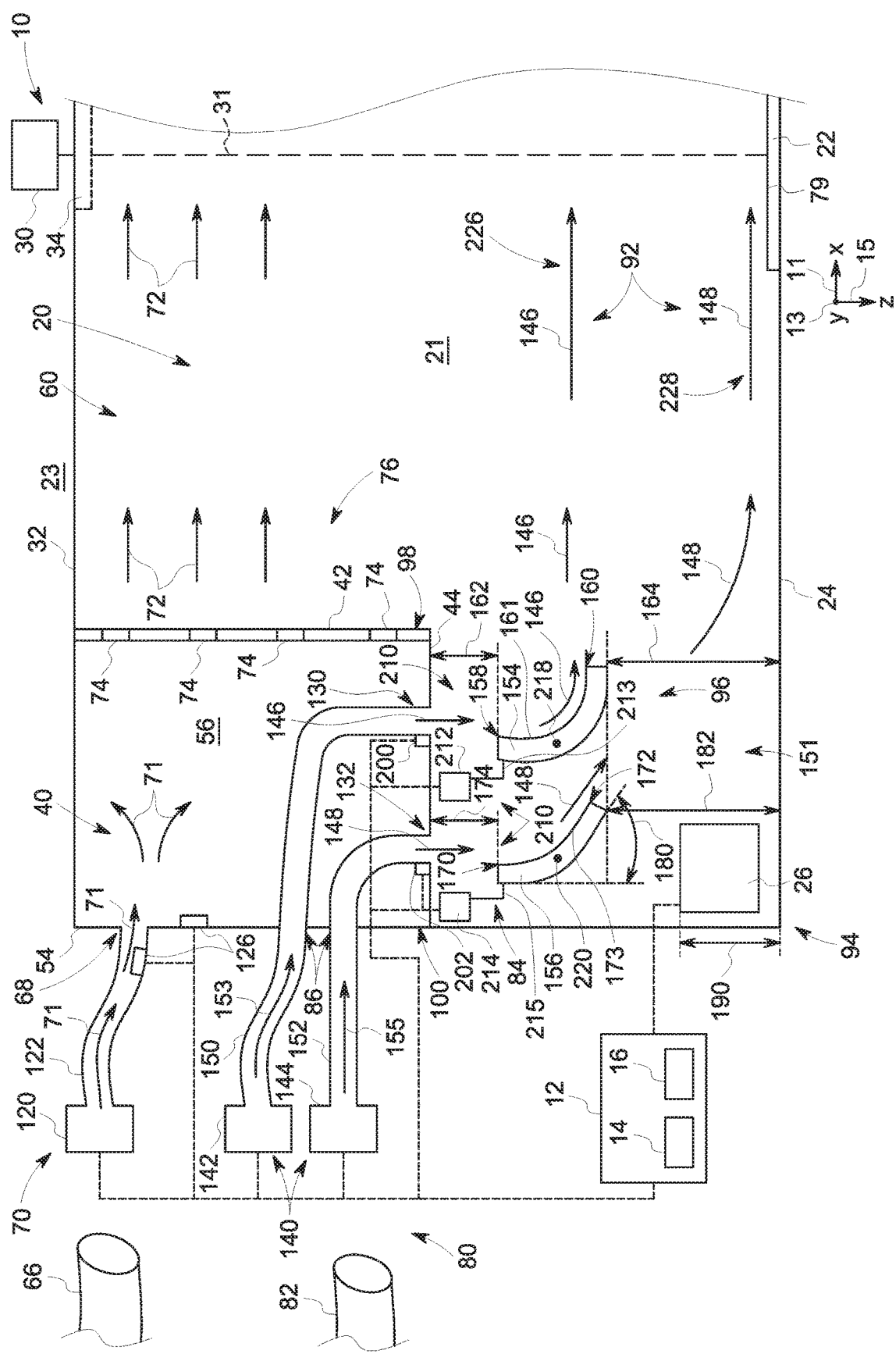
FIG. 3 is a cross-sectional schematic diagram of an embodiment of the flow directing system included in the AM system of FIG. 2, in accordance with present embodiments.

The embodiment of the AM system 10 shown in FIG. 2 also includes a lower gas delivery system 80, which includes a lower gas delivery device 82 that, similar to the upper gas delivery device 66 discussed above, may include any suitable conveying devices and/or flow generating devices that regulate a flow rate and/or pressure of gas flow from a suitable gas source, such as the gas supply line. The lower gas delivery system 80 includes at least one conduit (as shown in FIG. 3) that fluidly couples the lower gas delivery device 82 to a lower gas inlet 84 disposed within the plenum dividing wall 44. For example, the rear wall 54 of the housing 18 (e.g., a portion of the rear wall 54 along the height 62 of the plenum 40) includes one or more additional apertures 86, which enables the at least one conduit to extend from the lower gas delivery device 82, through the rear wall 54 and the plenum chamber 56, and couple to the lower gas inlet 84.

For clarity, it should be noted that a flow path between the lower gas delivery device 82 and the lower gas inlet 84 is separate from a flow path between the upper gas delivery device 66 and the upper gas inlet 76 in the illustrated embodiment of FIG. 2. In other words, gas flow is blocked from the plenum chamber 56 to the lower gas inlet 84 and vice versa. However, as described in greater detail herein, in certain embodiments of the AM system 10, the lower gas inlet 84 may be fluidly coupled to the plenum chamber 56. Additionally, in some embodiments, the upper gas delivery device 66 and the lower gas delivery device 82 may be a single gas delivery device that is configured to supply a gas flow to both the plenum chamber 56 and the lower gas inlet 84.

The lower gas inlet 84 discharges a lower gas flow 92 into a lower portion 94 of the chamber 20, which includes any portion of the chamber 20, or portions of the chamber 20 disposed vertically below (e.g., with respect the z-axis 15) the plenum dividing wall 44. For example, in some embodiments, the lower portion 94 may include a lower 50%, lower 40%, lower 30%, or a lower 20% of the chamber 20, depending on a position of the plenum dividing wall 44 with respect to the z-axis 15. The lower gas flow 92 is directed from the lower gas inlet 84 toward a flow directing system 96 disposed within the lower portion 94 of the chamber 20, proximate the bottom wall 24. In some embodiments, the lower gas inlet 84 includes a generally rectangular slot extending along the width 52, or a substantial portion of the width 52 of the chamber 20, such as shown in the illustrated embodiment of FIG. 2. However, in other embodiments, the lower gas inlet 84 may include a plurality of individual holes or apertures that are configured to regulate certain flow parameters of the lower gas flow 92, similar to the plurality of openings 74 of the upper gas inlet 76 discussed above. As described in greater detail herein, in certain embodiments, the lower gas inlet 84 may include a plurality of gas inlets that are staggered relative to one another with respect to the x-axis 11. Accordingly, the lower gas inlet 84 may be configured (e.g., shaped, designed, arranged) to discharge a plurality of individual lower gas flows that are separate of one another, where each gas flow of the plurality of gas flows is spaced apart from one another along the x-axis 11 and/or the y-axis 13. For example, a first lower gas flow may discharge from the lower gas inlet 84 near a frontward portion 98 of the plenum 40, while a second, separate lower gas flow discharges from the lower gas inlet 84 near a rearward portion 100 of the plenum 40.

Although the lower gas flow 92 is shown as discharging from the lower gas inlet 84 in the z-direction 15 that is perpendicular to the plenum dividing wall 44 (e.g., offset 90 degrees with respect to the plenum dividing wall 44, crosswise or perpendicular to the x-direction 11, in a second direction nonparallel to the build platform 22) in the illustrated embodiment of FIG. 2, it should be noted that a flow direction of the lower gas flow 92 may form any suitable angle with the plenum dividing wall 44. For example, in certain embodiments, the lower gas inlet 84 may be disposed within the rearward portion 100 of the plenum 40, while the flow directing system 96 is disposed beneath the frontward portion 98 of the plenum 40. Accordingly, a flow angle 104 (e.g., an angle within the x-z plane) formed between a flow direction of the lower gas flow 92 and the plenum dividing wall 44 may be less than 90 degrees, such that the lower gas flow 92 may flow from the lower gas inlet 84 near the rearward portion 100 toward the flow directing system 96 near the frontward end portion 98 of the plenum 40. Conversely, in embodiments where the lower gas inlet 84 is disposed near the frontward portion 98 of the plenum 40 while the flow directing system 96 is disposed near the rearward portion 100 of the plenum 40, the flow angle 104 formed between the flow direction of the lower gas flow 92 and the plenum dividing wall 44 may be greater than 90 degrees.

Regardless, the lower gas flow 92 is guided from the lower gas inlet 84 to the flow directing system 96 which, as described in greater detail herein, redirects the lower gas flow 92 from an initial flow direction (e.g., the z-direction 15) to a subsequent flow direction (e.g., the x-direction 11). Accordingly, the lower gas flow 92 discharging from the flow directing system 96 may flow along the x-direction 11, parallel to the top surface 79 of the build platform 22, which may mitigate interaction between the lower gas flow 92 and the powder bed 28 disposed on the build platform 22. In other words, because the lower gas flow 92 is directed parallel or horizontally across the build platform 22, rather than at an angle toward the build platform 22, the lower gas flow 92 may not disturb the powder bed 28 (e.g., due to vortices and/or pressure forces generated by the lower gas flow 92). However, it should be noted that the flow directing system 96 may direct the lower gas flow 92 across the build platform 22 in a direction substantially parallel (e.g., approximately parallel) to the x-direction 11 in some embodiments of the AM system 10. For example, in some embodiments, the flow directing system 96 may direct the lower gas flow 92 across the build platform 22 in a direction that is at an angle of ±10 degrees relative to the x-direction 11. Accordingly, it should be noted that the term "parallel" used herein refers to directions that are parallel to the x-axis 11, the y-axis 13, or the z-axis 15, or directions that are substantially parallel to the x-axis 11, the y-axis 13, or the z-axis 15, respectively (e.g., at a tolerance of ±10 degrees relative to the x-axis 11, the y-axis 13, or the z-axis 15).

As described in greater detail herein, the flow directing system 96 reduces a volume of space occupied by the lower gas delivery system 80 within the chamber 20. For example, a length 106 (e.g., with respect to the x-axis 11) of the flow directing system 96 may be relatively small, such that the flow directing system 96 occupies a marginal portion (e.g., less than 10%, less than 5%, less than 1%) of a total length 108 of the chamber 20. Accordingly, the build platform 22 may extend across substantially all of the length 108 of the chamber 20, which may enable the AM system 10 to manufacture objects that are relatively large, without interference between the flow directing system 96 and the objects being manufactured. Further, because the length 106 of the flow directing system 96 is relatively small, the flow directing system 96 may enable a reduction in a length 110 of the plenum 40, beneath which the flow directing system 96 is disposed. As such, reducing the length 110 of the plenum 40 may further increase a usable length of the chamber 20 of the AM system 10 and/or reduce the size of the AM system 10.

The AM system 10 shown in FIG. 2 also includes a gas outlet 112 for discharging a gas flow 114 from the chamber 20. The discharged gas flow 114 may include the upper gas flow 72, the lower gas flow 92, as well as a substantial portion of any smoke and/or particulate matter that is generated during the AM process. In the illustrated embodiment, the gas outlet 112 is arranged in the front wall 78 of the housing 18, opposing the rear wall 54. The gas outlet 112 may be arranged toward the upper portion 60 of the chamber 20, such that the upper gas flow 76 travels tangentially above the build platform 22 and through the gas outlet 112. However, in other embodiments, the gas outlet 112 may be disposed within the lower portion 94 of the chamber 20. While the gas outlet 112 is illustrated as being circular in shape in FIG. 2 for simplicity, the gas outlet 112 can be of any suitable shape (e.g., rectangular, polygon, oval) that enables sufficient discharging of the gas flow 114. Further, in some embodiments, the gas outlet 112 may include a plurality of openings defined within the front wall 78 of the housing 18, which may be positioned near the upper portion 60 of the chamber 20, the lower portion 94 of the chamber 20, or both. The gas outlet 112 may be coupled to a suction mechanism to draw and discharge the gas flow 114 from the chamber 20. In some embodiments, the suction mechanism may also include a filtration system that is configured to filter the gas flow 114, for example, by removing any smoke and/or particulate matter suspended within the gas flow 114 that has been removed from the chamber 20. After filtration of the gas flow 114, the gas flow may be directed toward the upper gas delivery device 66 and/or the lower gas delivery device 82 for reuse in the upper and lower gas delivery systems 70, 80. It should be noted that the upper and lower gas flows 72, 92 may include inert gasses, such as argon or nitrogen, but may additionally include any other suitable gas configured to facilitate removal of the smoke and/or particulate matter generation during operation of the AM system 10 from the chamber 20.

FIG. 3 is a schematic side view illustrating an embodiment of the chamber 20 of the AM system 10, in accordance with present embodiments. In the illustrated embodiment, the AM system 10 includes an upper flow generating device 120 (e.g., a pump or blower), which forms part of the upper gas delivery device 66 and/or is disposed within the upper gas delivery device 66. A conduit 122 extends between the upper flow generating device 120 and the plenum 40, such that the upper flow generating device 120 may direct a gas 71 (e.g., a gas forming the upper gas flow 72) from the upper gas delivery device 66 to the plenum chamber 56 (e.g., through the aperture 68 disposed within the rear wall 54). In certain embodiments, the upper flow generating device 120 may modulate a flow rate of the gas 71 supplied to the plenum chamber 56 and/or a pressure of the gas 71 within the plenum chamber 56, which may affect certain flow characteristics of the upper gas flow 72. Accordingly, the upper flow generating device 120 may be used to adjust such flow characteristics of the upper gas flow 72 in addition to, or in lieu of, the plurality of openings 74.

For example, a target pressure of the gas 71 within the plenum chamber 56 may correspond to a predetermined flow rate and/or a predetermined flow velocity of the upper gas flow 72. Accordingly, the target pressure within the plenum chamber 56 may be adjusted to achieve a desired flow rate and/or a desired flow velocity of the upper gas flow 72 discharging from the plurality of openings 74. A magnitude of the target pressure corresponding to the desired flow rate and/or the desired flow velocity of the upper gas flow 72 may be previously determined using computer modeling simulations (e.g., computational fluid dynamics software) and/or empirical tests.

As shown in the illustrated embodiment, the plenum 40 includes one or more sensors 126 disposed within the plenum chamber 56 that are configured to measure parameters indicative of a pressure of the gas 71 within the plenum chamber 56. The sensors 126 may include pressure transducers, pressure gauges, or any other suitable pressure measuring instrument. The upper flow generating device 120 and the sensors 126 are communicatively coupled to the controller 12 via one or more control transfer devices, such as wires, cables, wireless communication devices, and the like. Accordingly, the controller 12 may receive feedback from the sensors 126 indicative of an actual pressure of the gas 71. In some embodiments, the controller 12 compares the actual pressure to a target pressure (e.g., a target pressure previously stored in the memory circuitry 14) and instructs the upper flow generating device 120 to increase or decrease a flow rate of the gas 71 flowing into the plenum chamber 56 when the actual pressure deviates from the target pressure by a predetermined threshold amount (e.g., ±10% of the target pressure, ±5% of the target pressure, ±1% of the target pressure). The controller 12 may thus ensure that a flowrate and/or a flow velocity of the upper gas flow 72 discharging from the plurality of openings 74 remains substantially similar to the predetermined flow rate and/or the predetermined flow velocity of the upper gas flow 72. For example, in some embodiments, the predetermined flow rate may be between about 20 cubic meters per minute ($m^3$/min) and 1200 $m^3$/min, between about 80 $m^3$/min and 800 $m^3$/min, or between about 200 $m^3$/min and 400 $m^3$/min, and the predetermined flow velocity may be between 0.5 meters per second (m/s) and about 10 m/s, between about 2 m/s and about 8 m/s, or between about 3 m/s and about 5 m/s.

It should be noted that the sensors 126 are not limited to pressure sensors, but may include any suitable types of sensors or sensor array that enables the controller 12 to monitor and adjust flow characteristics of the upper gas flow 72. For example, the sensors 126 may additionally or otherwise include flow rate sensors, temperature sensors, mass flow sensors, or any other suitable sensors configured to provide the controller 12 with feedback indicative of flow characteristics of upper gas flow 72. In certain embodiments, the sensors 126 may be disposed externally of the plenum chamber 56, such as within the chamber 20, near the plurality of openings 74, or within a suitable portion of the upper gas delivery device 66. The controller 12 may use the feedback acquired by the sensors 126 in accordance with the techniques discussed above to control operation of the upper flow generating device 120. In addition, it should be noted that while the illustrated embodiment of FIG. 3 shows a single flow generating device (e.g., the upper flow generating device 120) fluidly coupled to the plenum chamber 56, the AM system 10 may include two or more flow generating devices that are each configured to facilitate flowing gas from the upper gas delivery device 66 into the plenum chamber 56 of the plenum 40.

As noted above, the lower gas inlet 84 may include a plurality of separate gas inlets that extend along the plenum dividing wall 44 in the y-direction 13, and are sequentially spaced apart from one another along the plenum dividing wall 44 with respect to the x-direction 11. For example, the lower gas inlet 84 may include a first lower gas inlet 130 and a second lower gas inlet 132 that collectively from the lower gas inlet 84. As shown in the illustrated embodiment of FIG. 3, the first lower gas inlet 130 extends along a portion of the width 52 (as illustrated in FIG. 2) of the chamber 20, or substantially all of the width 52 of the chamber 20, and is disposed near the frontward portion 98 of the plenum 40. The second lower gas inlet 132 extends along a portion of the width 52 of the chamber 20, or substantially all of the width 52 of the chamber 20, and is disposed near the rearward portion 100 of the plenum 40.

As shown in the illustrated embodiment, the AM system 10 includes a pair of lower flow generating devices 140, which includes a first lower flow generating device 142 and a second lower flow generating device 144. The pair of lower flow generating devices 140 form part of the lower gas delivery device 82 and/or are disposed within the lower gas delivery device 82. Similar to the upper flow generating device 120 discussed above, the pair of lower flow generating devices 140 may include any suitable pump or blower configured to direct gas (e.g., the lower gas flow 92) from the lower gas delivery device 82 to the chamber 20.

For the illustrated embodiment, the first lower flow generating device 142 and the second lower flow generating device 144 are fluidly coupled to the first lower gas inlet 130 and the second lower gas inlet 132 via a first conduit 150 and a second conduit 152, respectively. Accordingly, the first and second conduits 150, 152 fluidly couple the lower gas delivery device 82 to the lower gas inlet 84, such that the lower gas delivery device 82 may supply a gas flow thereto. In some embodiments, a sealing material (e.g., a gasket, silicone, etc.) may be disposed between the first and second conduits 150, 152 and the additional apertures 86, which may block leakage of the pressurized gas 71 from within the plenum chamber 56 into the ambient atmosphere 23 through interstitial spaces formed between the first and second conduits 150, 152 and the additional apertures 86. As shown in the illustrated embodiment, the first and second conduits 150, 152 extend through a portion of the plenum chamber 56, such that the first and second conduits 150, 152 do not occupy space within a tooling area 151 or storage area disposed below the plenum 40. Advantageously, integrating the first and second conduits 150, 152 and the lower gas inlet 84 within the plenum 40 may enable the tooling area 151 to remain substantially free from components of the lower gas delivery device 82, such that the lower gas delivery device 82 does not hinder operation of certain components that may be disposed within the tooling area 151, such as the powder application device 26.

As described in greater detail herein, the first lower flow generating device 142 regulates a flow (e.g., a volumetric flow rate, a mass flow rate, a flow velocity) of gas 153 through the first conduit 150 and the first lower gas inlet 130. Similarly, the second lower flow generating device 144 regulates a flow (e.g., a volumetric flow rate, a mass flow rate, a flow velocity) of gas 155 through the second conduit 152 and the second lower gas inlet 132. Accordingly, the first and second lower flow generating devices 142, 144 enable the discharge of a first lower gas flow 146 (e.g., a gas flow formed by the gas 153) and a second lower gas flow 148 (e.g., a gas flow formed by the gas 155) vertically into the chamber 20, which collectively form the lower gas flow 92. It should be noted that the term "vertically" used herein refers to directions that are parallel to the z-axis 15, or directions that are substantially parallel to the z-axis 15 (e.g., at a tolerance of ±10 degrees relative to the z-axis 15). Accordingly, the first and second lower gas flows 146, 148 are initially discharged into the chamber 20 in a direction nonparallel to the build platform 22.

Although the illustrated embodiment of FIG. 3 illustrates the pair of lower flow generating devices 140, each associated with a corresponding one of the first lower gas inlet 130 and the second lower gas inlet 132, it should be noted that the AM system 10 may include any suitable number of flow generating devices associated with respective gas inlets of the lower gas inlet 84. For example, the AM system 10 may include 2, 3, 4, 5, or more flow generating devices that are each associated with a respective one of 2, 3, 4, 5, or more lower gas inlets included in the lower gas inlet 84. In other embodiments, a single flow generating device may be used to supply a gas from the lower gas delivery device 82 to each inlet of the lower gas inlet 84. For example, the first and second lower gas inlets 130, 132 may each be fluidly coupled to the first lower flow generating device 142, such that the second lower flow generating device 144 may be omitted from the AM system 10. In yet further embodiments, a single flow generating device may supply gas to the plenum chamber 56, the first lower gas inlet 130, and the second lower gas inlet 132. For example, in such embodiments, the lower gas inlet 84 may be fluidly coupled to the plenum chamber 56 of the plenum 40, while a flow generating device supplies a gas to the plenum chamber 56.

The first and second lower gas inlets 130, 132 are oriented to respectively direct the first and second lower gas flows 146, 148 toward the flow directing system 96 disposed within the lower portion 94 of the chamber 20 below the plenum 40. In the illustrated embodiment, the flow directing system 96 includes a first flow directing element 154 and a second flow directing element 154 that are configured to receive the first lower gas flow 146 and the second lower gas flow 148, respectively. The first flow directing element 154 is disposed beneath the first lower gas inlet 130 and is substantially aligned (e.g., with respect to a position along the x-axis 11) with the first lower gas inlet 130. Similarly, the second flow directing element 156 is disposed beneath the second lower gas inlet 132 and is substantially aligned (e.g., with respect to a position along the x-axis 11) with the second lower gas inlet 132. Accordingly, the first and second lower gas flows 146, 148 may flow along the z-direction 15 from the first and second lower gas inlets 130, 132 to the first and second flow directing elements 154, 156, respectively.

It should be noted that in certain embodiments, the first and second flow directing elements 154, 156 are not disposed directly beneath the first and second lower gas inlets 130, 132. For example, the first flow directing element 154 may be disposed substantially near the frontward portion 98 of the plenum 40, while the second flow directing element 156 is disposed substantially near the rearward portion 100 of the plenum 40. In such embodiments, the first and second lower gas inlets 130, 132 may be angled (e.g., with respect to the z-axis 15, along the x-z plane), such that the first and second lower gas flows 146, 148 discharging from the first and second lower gas inlets 130, 132 are directed toward the first and second flow directing elements 154, 156, respectively.

The first and second flow directing elements 154, 156 each include a curved profile or surface that is configured to receive a respective one of the first and second lower gas flows 146, 148. For example, in the illustrative embodiment, the first flow directing element 154 includes a first end portion 158 oriented along the z-axis 15 and a second end portion 160 oriented along the x-axis 11. The first and second end portions 158, 160 are tangentially connected via a contoured profile or surface 161 extending therebetween, which forms the first flow directing element 154. The first end portion 158 is disposed at a first distance 162 below the plenum dividing wall 44 (with respect to the z-direction 15), while the second end portion 160 is disposed at a height 164 above the bottom wall 24. Accordingly, the first lower gas flow 146 may flow from the first lower gas inlet 130 to the first end portion 158 of the first flow directing element 154, along the contoured surface 161 of the first flow directing element 154, and discharge from the second end portion 160 of the first flow directing element 154 along the x-direction 11 (e.g., generally perpendicular to the z-direction 15). The first lower gas flow 146 discharges from the first flow directing element 154 at a first flow elevation that roughly corresponds to the height 164 of the first flow directing element 154 depending on the thickness of the first flow directing element 154. Accordingly, the first lower gas flow 146 may flow toward the build platform 22 at roughly the height 164 of the first flow directing element 154, and parallel across the build platform 22 at roughly the height 164 of the first flow directing element 154.

Similar to the first flow directing element 154 discussed above, the second flow directing element 156 includes a first end portion 170 and a second end portion 172 with a contoured surface 173 extending tangentially therebetween. The first end portion 170 of the second flow directing element 156 is disposed at a second distance 174 below the plenum dividing wall 44 which, in the illustrated embodiment, is equal to the first distance 162. As shown in the illustrated embodiment of FIG. 3, the first end portion 170 of the second flow directing element 156 is oriented along the z-direction 15, such that the first end portion 170 of the second flow directing element 156 and the first end portion 158 of the first flow directing element 154 are oriented parallel to one another. However, the second end portion 172 of the second flow directing element 156 is not oriented parallel to the second end portion 160 of the first flow directing element 154 in the illustrated embodiment. Rather, the second end portion 172 of the second flow directing element 156 is oriented at an angle 180 (e.g., an angle relative to the z-axis 15 in the x-z plane) relative to the first end portion 170 of the second flow directing element 156.

For example, in some embodiments, the angle 180 may be between about 30 degrees and about 85 degrees, between about 45 degrees and about 60 degrees, or about 50 degrees. Orienting the second end portion 172 of the second flow directing element 156 at the angle 180 enables the second flow directing element 156 to guide the second lower gas flow 148 beneath the first flow directing element 154. For example, the second lower gas flow 148 may impinge on the bottom wall 24 of the chamber 20 after discharging from the second flow directing element 156, such that the bottom wall 24 may redirect the second lower gas flow 148 in the x-direction 11. Accordingly, the second lower gas flow 148 is guided along the bottom wall 24 in the x-direction 11 toward the build platform 22. Therefore, the second lower gas flow 148 may be oriented in a flow direction that is substantially parallel the top surface 79 of the build platform 22, which may mitigate interaction (e.g., disturbances due to vortices generated by the second lower gas flow 148) between the second lower gas flow 148 and the powder bed 28 disposed on the build platform 22. The second lower gas flow 148 thus flows beneath the first lower gas flow 146, at a second flow elevation that is less than the first flow elevation (e.g., with respect to the bottom wall 24 of the chamber 20). Accordingly, a height 182 of the second flow directing element 156 may be substantially equal to the height 164 of the first flow directing element 154 without impinging the second lower gas flow 148 onto the first flow directing element 154. However, as discussed in greater detail herein, the height 182 of the second flow directing element 156 may be greater than or less than the height 164 of the first flow directing element 154 in certain embodiments of the flow directing system 96.

In some embodiments, the first and second flow directing elements 154, 156 may each include a similar cross-sectional shape, such as the generally quarter-circle cross-sectional shape of the first flow directing element 156 shown in FIG. 3. In such embodiments, both the first and second flow directing elements 154, 156 are configured to receive the first and second lower gas flows 146, 148, respectively, in the z-direction 15 and discharge the first and second lower gas flows 146, 148 in the x-direction 11, cross-wise (e.g., perpendicular) to the z-direction 15. In other words, the angle 180 of the second flow directing element 156 may be substantially equal to 90 degrees in such embodiments. It should be noted that the shapes of the first and second flow directing elements 154, 156 may be proportioned or scaled differently from one another in certain embodiments of the AM system 10. For example, a radius of curvature and/or a length of the contoured surface 161 of the first flow directing element 154 may be less than, or greater than a radius of curvature and/or a length of the contoured surface 173 of the second flow directing element 156.

In some embodiments, to avoid impinging the second lower gas flow 148 onto the first flow directing element 154, the height 182 of the second flow directing element 156 may be less than the height 164 of the first flow directing element 154. Accordingly, the second lower gas flow 148 may flow beneath the first flow directing element 154 (e.g., in the x-direction 11) without interacting (e.g., impinging) with the first flow directing element 154. In some cases, the height 164 of the first flow directing element 154 may be increased in addition to, or in lieu of, decreasing the height 182 of the second flow directing element 156, to further facilitate flowing the second lower gas flow 148 beneath and past the first flow directing element 154.

As noted above, the flow directing system 96 may be located in the tooling area 151 disposed below the plenum 40 (e.g., beneath the plenum dividing wall 44). In such embodiments, the flow directing system 96 may be positioned such that the first and second flow directing elements 154, 156 do not hinder operation of certain tools of the AM system 10 that may be disposed within the tooling area 151 and/or operate within the tooling area 151, such as the powder application device 26. For example, the heights 164, 182 of the first and second flow directing elements 154, 156 are adjusted to a sufficient value to allow the powder application device 26 to translate axially (e.g., along the x-direction 11) along the bottom wall 24 of the chamber 20, beneath the first and second flow directing elements 154, 156. In other words, the first and second flow directing elements 154, 156 may be positioned such that a lesser of the heights 164, 182 is greater than a total height 190 of the powder application device 26 (e.g., a distance between the bottom wall 24 and a top surface of the powder application device 26).

In the illustrated embodiment of FIG. 3, the flow directing system 96 also includes a pair of actuators 210 that are configured to adjust an orientation of the first and second flow directing elements 154, 156. For example, a first actuator 212 of the pair of actuators 210 is coupled to the first flow directing element 154 via a transfer mechanism 213 (e.g., a linkage, a threaded rod, a fastener), while a second actuator 214 of the pair of actuators 210 is coupled to the second flow directing element 156 via a transfer mechanism 215 (e.g., a linkage, a threaded rod, a fastener). The first and second actuators 212, 214 may include a linear actuator, a servo mechanism, a pneumatic actuator, or any other suitable actuator configured to adjust an orientation of the first and second flow directing elements 154, 156. The pair of actuators 210 may be configured to rotate the first and second flow directing elements 154, 156 (e.g., in a plane formed by the x- and z-axes 11, 15) about a first centerline 218 (e.g., a rotational axis parallel to the y-axis 13) and a second centerline 220 (e.g., a rotational axis parallel to the y-axis 13), respectively. As shown in the illustrated embodiment, the first and second centerlines 218, 220 extend through a body of the first and second flow directing elements 154, 156. However, in other embodiments, the first and second centerlines 218, 220 may extend near any other suitable portion of the first and second flow directing elements 154, 156, such as the first end portion 158 of the first flow directing element 154 and the first end portion 170 of the second flow directing element 158, respectively. In any case, the first and second actuators 212, 214 may rotate the first and second flow directing elements 154, 156 about the first and second centerlines 218, 220. In some embodiments, the controller 12 instructs the first and second actuators 212, 214 to rotate the first and second flow directing elements 154, 156 based on feedback acquired by the one or more sensors 126. For example, the controller 12 may adjust an orientation of the first and second flow directing elements 154, 156 in response to an increase or decrease of a flow velocity of the first and second lower gas flows 146, 148, respectively, or based on any other suitable operating parameter(s) of the AM system 10. It should be noted that in certain embodiments, a single actuator may be used to adjust a position of both the first and second flow directing elements 154, 156. Further, although the pair of actuators 210 have been described as rotating the first and second flow directing elements 154, 156 about an axis, it should be noted that the pair of actuators 210 may also translate the first and second flow directing elements 154, 156 axially (e.g., along the x-, y-, and/or z-axes 11, 13, 15) in certain embodiments of the AM system 10.

The pair of actuators 210 are communicatively coupled to the controller 12, such that the controller 12 may instruct the pair of actuators 210 to adjust a position of the first and second flow directing elements 154, 156 based on certain operational parameters of the AM system 10. For example, the controller 12 may adjust a position of the first flow directing element 154, a position of the second flow directing element 156, or both, in an orientation that directs the lower gas flow 92 toward the build platform 22, the energy generating system 30, the gas outlet 112, or any other suitable component(s) of the AM system 10. Accordingly, the controller 12 may adjust and operational position of the first and second flow directing elements 154, 156. Further, the controller 12 may instruct the pair of actuators 210 to move the first and second flow directing elements 154, 156 to a retracted position near the plenum 40 while tools of the AM system 10 enter or leave the tooling area 151 disposed beneath the plenum 40. For example, the controller 12 may position the first and second flow directing elements 154, 156 such that a vertical distance (e.g., a distance along the z-axis 15) between the bottom wall 24 and the first and second flow directing elements 154, 156 is at a maximum value while the powder application device 26 is moved into or out of the tooling area 151 (e.g., translated along the x-axis 11). In other words, the controller 12 positions the first and second flow directing elements 154, 156 such that a magnitude of the height 164 of the first flow directing element 154 and a magnitude of the height 182 of the second flow directing element 156, respectively, is increased or set to a maximum value. Accordingly, the flow directing system 96 may facilitate moving tools into or out of the tooling area 151 that are relatively large, and would not otherwise fit between the first and second flow directing elements 154, 156 and the bottom wall 24 of the chamber 20.

In the illustrated embodiment of FIG. 3, a first sensor 200 and a second sensor 202 are disposed adjacent the first lower gas inlet 130 and adjacent the second lower gas inlet 132, respectively. It should be noted that the first sensor 200 and the second sensor 202 form part of the plurality of sensors 126. The first and second sensors 200, 202 are communicatively coupled to the controller 12 and configured to provide the controller 12 with feedback indicative of certain parameters of the first lower gas flow 146 and the second lower gas flow 148. For example, the first and second sensors 200, 202 may provide the controller 12 with feedback indicative of a flow rate of the first and second lower gas flows 146, 148, a pressure within the first and second conduits 150, 152, a temperature of the first and second lower gas flows 146, 148, or any other suitable parameters of the first and second lower gas flows 146, 148. The first and second sensors 200, 202 may include, but are not limited to, flow rate sensors (e.g., mass flow sensors, rotameters), pressures sensors (e.g., pressure transducers), thermal sensors (e.g., resistance temperature detectors, thermocouples), or any other suitable sensors. In some embodiments, the controller 12 may instruct the first and second lower flow generating devices 142, 144 to adjust certain parameters of the first lower gas flow 146 and the second lower gas flow 148, respectively, in response to the feedback received by the plurality of sensors 126.

For example, the controller 12 may measure an actual flow velocity of the first and/or second lower gas flows 146, 148 using the first and second sensors 200, 202. The controller 12 may compare the measured actual flow velocities to a target flow velocity of each of the first and second lower gas flows 146, 148, which may be previously determined and stored in the memory circuitry 14 of the controller 12. The controller 12 may instruct the first and/or second lower flow generating devices 142, 144 to increase or decrease a flow velocity of the first lower gas flow 146 and/or the second lower gas flow 148, respectively, if the actual flow velocity of the first lower gas flower 146 and/or the second lower gas flow 148 deviates from the respective target values by a predetermined amount or threshold. Accordingly, the controller 12 may ensure that a flow velocity of the first lower gas flow 146 and a flow velocity of the second lower gas flow 148 remains substantially close (e.g., ±10% of the target velocity, ±5% of the target velocity, ±1% of the target velocity) to a respective target for velocity of the first and second lower gas flows 146, 148.

The controller 12 may instruct the pair of lower flow generating devices 140 to discharge gas through each of the lower gas inlets (e.g., the first and second lower gas inlets 130, 132) at a particular flow velocity and/or flow rate, and thus, generate a desired velocity gradient across the lower gas flow 92 along the z-axis 15. For example, a flow velocity of an upper portion 226 of the lower gas flow 92 (e.g., a flow velocity of the first lower gas flow 146 at the first flow elevation) may be greater than, or less than, a flow velocity of a lower portion 228 of the lower gas flow 92 (e.g., a flow velocity of the second lower gas flow 148 at the second flow elevation) in certain embodiments of the AM system 10. As a non-limiting example, the target flow velocity of the first lower gas flow 146 may be between about 1 m/s and about 20 m/s, or between about 5 m/s and about 15 m/s, while the target flow velocity of the second lower gas flow 148 may be between about 0.5 m/s and about 10 m/s, or between about 3 m/s and about 8 m/s. Accordingly, a flow velocity of the lower gas flow 92 may increase or decrease from the upper portion 226 of the lower gas flow 92 to the lower portion 228 of the lower gas flow 92. However, in other embodiments, the pair of lower gas flow generating devices 140 may be used to generate any other suitable velocity gradient across the lower gas flow 92. For example, a target flow velocity of the first lower gas flow 146 may be substantially equal to a target flow velocity of the second lower gas flow 148, such that a velocity of the lower gas flow 92 is substantially uniform. In some embodiments, a target flow rate of the first lower gas flow 146 and a target flow rate of the second lower gas flow 148 may each be between about 20 cubic meters per minute (m$^3$/min) and 400 m$^3$/min, between about 50 m$^3$/min and 300 m$^3$/min, or between about 80 m$^3$/min and 200 m$^3$/min. As noted above, the target flow rate of the first lower gas flow 146 may be greater than, less than, or equal to the target flow rate of the second lower gas flow 148 in various embodiments of the AM system 10.

Figure 4:
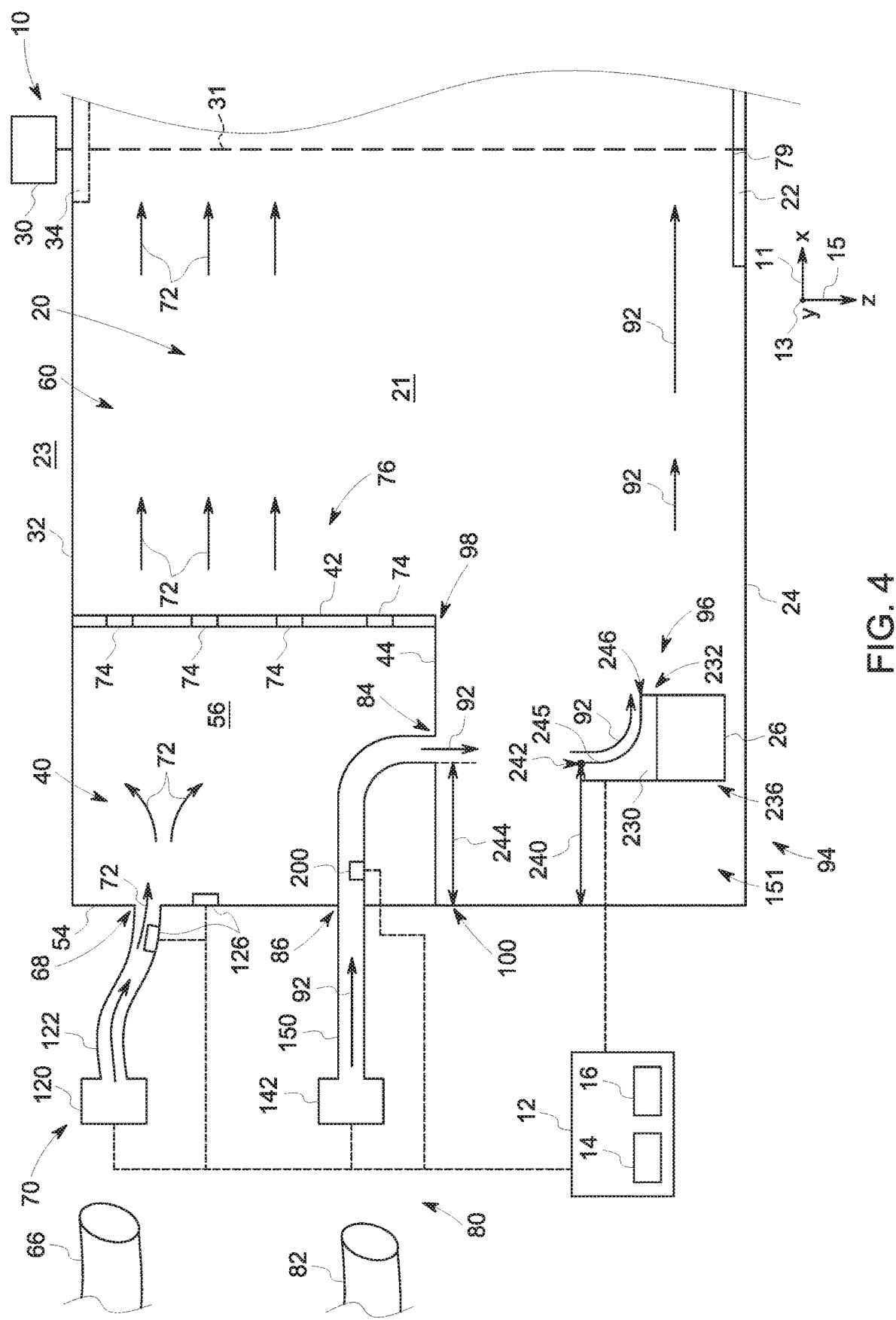
FIG. 4 is a cross-sectional schematic diagram of another embodiment of the flow directing system included in the AM system of FIG. 2, in accordance with present embodiments.

FIG. 4 is a schematic side view illustrating an embodiment of the chamber 20 of the AM system 10, in accordance with another embodiment of the present approach. In the illustrated embodiment, the AM system 10 includes the first lower flow generating device 142, which is configured (e.g., designed, arranged) to supply the lower gas flow 92 to the chamber 20 via the lower gas inlet 84. As shown in the illustrated embodiment, the flow directing system 96 is integrated with the powder application device 26. For example, the powder application 26 device includes a mobile flow directing element 230 that is disposed near a top portion 232 of the powder application device 26 and configured to receive the lower gas flow 92 discharging from the lower gas inlet 84. In some embodiments, the mobile flow directing element 230 may include a component that is separate of the powder application device 26 and coupled to the powder application device 26 via suitable fasteners and/or adhesives. However, in other embodiments, the mobile flow directing element 230 may be integrally formed (e.g., as a unitary component) with the powder application device 26 and/or a housing of the powder application device 26. In any case, the mobile flow directing element 230 is configured to translate with the powder application device 26 during operation of the AM system 10 (e.g., during powder deposition periods).

The controller 12 may instruct the powder application device 26 to remain disposed in a resting position 236 during certain operational periods of the AM system 10, such as when the energy generating system 30 directs the focused energy beam 31 onto the powder bed 28. For example, the powder application device 26 may be disposed in the resting position 236 between successive deposition periods of the powder application device 26, during which the powder application device 26 deposits powder onto the build platform 22. The resting position 236 may correspond to a position of the powder application device 26 in which the powder application device 26 is disposed substantially beneath the lower gas inlet 84 (e.g., with respect to a position along the x-axis 11). For example, in some embodiments, the controller 12 may position the powder application device 26 such that a distance 240 between the rear wall 54 and a first end portion 242 (e.g., a beginning of a contoured surface 245 or profile) of the mobile flow directing element 230 is substantially equal to a distance 244 between the rear wall 54 and the lower gas inlet 84. Accordingly, the mobile flow directing element 230 may receive the lower gas flow 92 at the first end portion 242 when the powder application device 26 is disposed in the resting position 236.

Similar to the first end portion 158 and the second end portion 160 of the first flow directing element 154 discussed above, the first end portion 242 of the mobile flow directing element 230 is oriented along the z-axis 15, while a second end portion 246 of the mobile flow directing element 230 is oriented along the x-axis 11. Accordingly, the mobile flow directing element 230 may receive the lower gas flow 92 in the z-direction 15, redirect the lower gas flow 92 along the contoured surface 245 or profile extending between the first end portion 242 and a second end portion 246 of the mobile flow directing element 230, and discharge the lower gas flow 92 in the x-direction 11 (e.g., substantially parallel to the build platform 22, perpendicular to the z-direction 15) toward the build platform 22. However, it should be noted that in other embodiments, the first and second end portions 242, 246 of the mobile flow directing element 230 may be oriented along any suitable direction. In other words, the first end portion 242 of the mobile flow directing element 230 and the second end portion 246 of the mobile flow directing element 230 need not extend perpendicular to one another.

In some embodiments, the controller 12 may temporarily suspend operation of the first lower flow generating device 142 while the powder application device 26 deposits a quantity the powder material onto the build platform 22 (e.g., during a deposition period of the powder application device 26). Accordingly, the lower gas flow 92 does not impinge on the bottom wall 24 of the chamber 20 (e.g., in the z-direction 15) while the powder application device 26 is not disposed in the resting position 236 (e.g., while the powder application device 26 deposits powder material onto the build platform 22). Temporarily disabling the lower gas flow 92 during each deposition period of the powder application device 26 may ensure that the lower gas flow 92 does not generate vortices within the chamber 20 (e.g., such as when the lower gas flow 92 impinges on the bottom wall 24) that may disturb the powder of the powder bed 28. In some embodiments, the controller 12 may also temporarily suspend operation of the upper flow generation device 120 while the powder application device 26 deposits the quantity of powder material onto the build platform 22. Accordingly, the controller 12 may ensure that the upper gas flow 72 does not disturb the powder on the powder bed 28.

Although the powder application device 26 is shown as having a single flow directing element (e.g., the mobile flow directing element 230) in the illustrated embodiment of FIG. 4, it should be noted that in other embodiments, the powder application device 26 may include 2, 3, 4, or more than 4 flow directing elements, which may each correspond to 2, 3, 4, or more than 4 lower gas inlets of the lower gas inlet 84. Accordingly, each of the flow directing elements may be configured to receive a respective gas flow originating from the lower gas inlet 84, and redirect the respective gas flow from the z-direction 15 to the x-direction 11 in accordance with the techniques discussed above. Advantageously, incorporating the flow directing system 96 with the powder application device 26 may reduce a volume of space occupied by the flow directing system 96 in the tooling area 151, which may facilitate moving tools of the AM system 10 into and out of the tooling area 151.

In some embodiments, the AM system 10 may include either or both of the first and second flow directing elements 154, 156 and the mobile flow directing element 230 of the powder application device 26. As a non-limiting example, the first lower flow generating device 142 may discharge the lower gas flow 92 in the z-direction 15 from the lower gas inlet 84 toward the first flow directing element 154. The first flow directing element 154 may receive the lower gas flow 92, and redirect the lower gas flow in an intermediate direction toward the mobile flow directing element 230. Accordingly, the mobile flow directing element 230 may receive the lower gas flow 92 in the intermediate direction, and subsequently redirect the lower gas flow 92 along the x-direction 11, toward and parallel to the top surface 79 the build platform 22.

Figure 5:
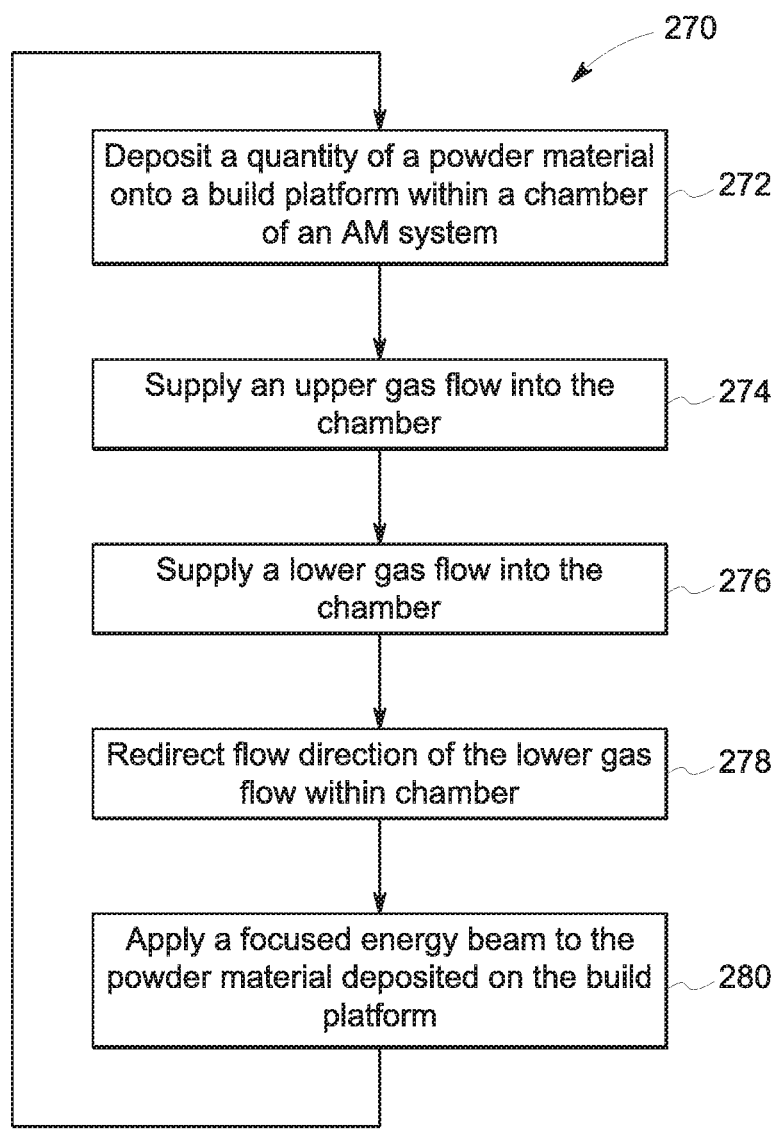
FIG. 5 is a flow chart of an embodiment of a process for operating the AM system of FIG. 2, in accordance with present embodiments.

With the foregoing in mind, FIG. 5 is a flow chart of an embodiment of a process 270 for operating the AM system 10. The following discussion references element numbers used throughout FIGS. 1-4. It should be noted that one or more of the steps of the process 270 may be implemented using routines or code stored in the memory circuitry 14 and executed by the processing circuitry 16 of the controller 12. The process 270 begins with depositing (step 272) a quantity of a powder material onto the build platform 22 within the chamber 20 of the AM system 10. For example, the controller 12 instructs the powder application device 26 to deposit the powder material onto the build platform 22. The controller 12 instructs the positioning system 36 to move the powder application device 26 and/or the platform 22 to any suitable positions relative to one another along the x-, y-, and z-axes 11, 13, 15, or a combination thereof, to deposit the powder material in a layer-by-layer manner during each deposition period of the powder application device 26. The powder application device 26 may deposit the powder material onto the build platform 22 while traversing the chamber 20 in the x-direction 11, the y-direction 13, the z-direction 15, or a combination thereof. It should be noted that in certain embodiments, the controller 12 suspends operation of the upper gas delivery device 66 and the lower gas delivery device 82 while the powder application device 26 deposits the powder material onto the build platform 22 (e.g., during deposition periods of the powder application device 26). Accordingly, the controller 12 may ensure that the upper gas flow 72 and the lower gas flow 92 do not disturb the powder material (e.g., due to vortices generated via interaction between the powder application device 26 and the upper gas flow 72 and/or the lower gas flow 92) during deposition periods of the powder application device 26.

In the illustrated embodiment, the process 270 continues with supplying (step 274) an upper gas flow into the chamber 20. For example, the controller 12 instructs the associated gas delivery mechanism (e.g., the upper gas delivery system 70) to supply the upper gas flow 72 into the chamber 20. By way of specific example, the controller 12 instructs the associated gas delivery mechanism to control the flow characteristics of the upper gas flow 72, such as flow distribution, flow rate (e.g., mass flow rate, volume flow rate), flow temperature, or any combination thereof. In certain embodiments, the controller 12 instructs the associated gas delivery mechanism to control content (e.g., argon, nitrogen, any other suitable inert gas, or a combination thereof) of the upper gas flow 72.

The illustrated embodiment of the process 270 also includes supplying (step 276) the lower gas flow 92 into the chamber 20. For example, the controller 12 instructs the associated gas delivery mechanism (e.g., the lower gas delivery system 80) to supply the lower gas flow 92 into the chamber 20 (e.g., via the lower gas inlet 84). By way of specific example, the controller 12 instructs the one or more associated gas delivery mechanisms (e.g., the gas delivery device 66, the gas delivery device 82) to control the flow characteristics of the lower gas flow 92, such as flow distribution, flow rate (e.g., mass flow rate, volume flow rate), flow temperature, or any combination thereof. The method includes redirecting (step 278) the lower gas flow 92 via the flow directing system 96. As a non-limiting example, the flow directing system 96 receives the lower gas flow 92 from the lower gas inlet 84 in the z-direction 15, and redirects the lower gas flow 92 (e.g., via the first flow directing element 154, the second flow directing element 156, the mobile flow directing element 230, or any combination thereof) in the x-direction 11. In some embodiments, the controller 12 instruct the associated gas delivery mechanism to control flow characteristics of the lower gas flow 92 to create a flow gradient (e.g., a gradient in terms of flow velocity or flow rate) in the lower gas flow 92. By way of specific example, the controller 12 may instruct the pair of lower flow generating devices 140 to discharge the lower gas flow 92 through respective inlets of the lower gas inlet 84 at different flow velocities and/or different flow rates. Accordingly, a flow rate and/or a flow velocity of the lower gas flow 92 proximate the bottom wall 24 of the chamber 20 may be greater than, or less than a flow rate and/or a flow velocity of the lower gas flow 92 proximate upper portion 226 of the lower gas flow 92. In certain embodiments, the controller 12 instructs the associated gas delivery mechanism to control content (e.g., argon, nitrogen, any other suitable inert gas, or a combination thereof) of the lower gas flow 92.

In some embodiments, the controller 12 may instruct the associated gas delivery mechanism and/or other gas flow control mechanisms of the AM system 10 to control the flow rates of the upper gas flow 72 and the lower gas flow 92 such that a ratio between the two gas flow rates is controlled at a desirable value or range. For example, the flow rate of the upper gas flow 72 may be in a range between about 0.2 times and about 2.5 times the flow rate of the lower gas flow 92, in a range between about 0.5 times and about 2.2 times the flow rate of the lower gas flow 92, or in a range between about 0.8 times and about 1.5 times the flow rate of the lower gas flow 92.

The illustrated embodiment of the process 270 includes selectively applying (step 280) a focused energy beam to the quantity of a powder material deposited on the build platform 22. For example, the controller 12 instructs the energy generating system 30 to apply the focused energy beam 31, such as a laser beam, to portions of the powder bed 28. The focused energy beam 31 selectively melts and/or sinters the powder material of the powder bed 28 in a predefined manner to form a solidified layer.

In some embodiments, supplying the upper gas flow 72 and supplying the lower gas flow 92 in the steps 274 and 276 may be performed simultaneously. In some embodiments, supplying the upper gas flow 72 in the step 274 may be performed before or after supplying the lower gas flow 92 in the step 276. In some embodiments, applying the focused energy beam 31 in the step 280 may be performed simultaneously to supplying the upper gas flow 72 in the step 274, supplying the lower gas flow 92 in the step 276, and/or redirecting the lower gas flow in the step 278. In some embodiments, applying the focused energy beam 31 in the step 280 may be performed before supplying the upper gas flow 72 in the step 274 or before supplying the lower gas flow 92 in the step 276. In some embodiments, the process 270 may repeat the steps 272, 274, 276, 278, and 280 to form additional solidified layer on the previously formed solidified layer. In some embodiments, the process 270 may include performing the steps 274 and 276 to supply the upper and lower gas flows 72, 92 every time after performing the step 280 to apply the focused energy beam 31. In some embodiments, the process 270 may include repeating the steps 272, 274, 276, 278, and 280 multiple times to form successive additional solidified layers to form the desired article (e.g., supplying the focused energy beam 31 in the step 280 is performed while the steps 274 and 276 are performed continuously to supply the upper and lower gas flows 72, 92).

The technical effects of the present disclosure include improving the performance and efficiency of an AM system by removing from the chamber, smoke and/or other particulate matter generated during the AM process. The disclosed AM system employs a combination of an upper gas flow that is supplied from a side in the upper portion of the chamber and directed parallel to a build platform, and a lower gas flow that is supplied from a dividing wall of the chamber in an initial flow direction and is redirected by a flow directing system in a direction toward the build platform and parallel to the build platform. Directing the lower gas flow parallel to the build platform may mitigate interaction between the lower gas flow and a powder bed disposed on the build platform. The lower gas flow may include one or more parallel streams that each include a same or different flow velocity or flow rate. The combination of the upper and lower gas flows, as well as fine tuning of their relative flow velocities may substantially reduce or eliminate gas entrainment within the chamber, and facilitate exhausting smoke and/or particulate matter inside the chamber through an exhaust outlet of the AM system.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:
1. An additive manufacturing system, comprising:
a housing defining a chamber;
a build platform disposed in a lower portion of the chamber;
an upper gas inlet disposed in a first side wall of the chamber above the build platform, wherein the upper gas inlet is configured to supply an upper gas flow in a first direction parallel to the build platform;
a lower gas inlet disposed in the chamber and configured to supply a lower gas flow in a second direction at least initially toward a bottom wall of the chamber;
a flow directing system disposed near the bottom wall and configured to receive the lower gas flow, wherein the flow directing system redirects the lower gas flow in the first direction parallel to the build platform;
one or more gas delivery devices fluidly coupled to the upper and lower gas inlets and configured to regulate one or more flow characteristics of the upper and lower gas flows; and
a gas outlet disposed in a second side wall of the chamber, wherein the gas outlet is configured to discharge the upper and lower gas flows from the chamber.

2. The additive manufacturing system of claim 1, wherein the flow directing system comprises a flow directing element comprising a curved profile that extends tangentially between a first end portion of the flow directing element and a second end portion of the flow directing element.

3. The additive manufacturing system of claim 2, wherein the first end portion is oriented along the second direction and the second end portion is oriented along the first direction.

4. The additive manufacturing system of claim 1, wherein the first direction extends perpendicular to the second direction.

5. The additive manufacturing system of claim 1, comprising a powder application device disposed within the chamber and configured to deposit a bed of powder onto the build platform, wherein a vertical distance between the bottom wall of the chamber and the flow directing system exceeds a height of the powder application device.

6. The additive manufacturing system of claim 1, wherein the flow directing system comprises:
a flow directing element, wherein the flow directing element is configured to rotate about an axis; and an actuator coupled to the flow directing element; and
wherein the additive manufacturing system comprises:
a controller communicatively coupled to the actuator and a sensor, wherein the controller is configured to instruct the actuator to rotate the flow directing element about the axis based on feedback provided by the sensor, and wherein the feedback is indicative of an operational parameter of the additive manufacturing system.

7. The additive manufacturing system of claim 1, wherein the lower gas inlet comprises a plurality of lower gas inlets configured to supply a plurality of lower gas flows in the second direction toward the bottom wall of the chamber, wherein the flow directing system comprises a plurality of flow directing elements each configured to receive a respective lower gas flow of the plurality of gas lower flows, and wherein each flow directing element of the plurality of flow directing elements redirects the respective lower gas flow in the first direction parallel to the build platform.

8. The additive manufacturing system of claim 7, wherein the one or more gas delivery devices are communicatively coupled to a controller, wherein the controller is configured to receive feedback indicative of a flow parameter of at least one lower gas flow of the plurality of lower gas flows via a corresponding sensor, and wherein the controller is configured to instruct the one or more gas delivery devices to adjust the flow parameter of the at least one lower gas flow based on the feedback, wherein the flow parameter comprises a flow velocity, a flow temperature, a flow rate, or any combination thereof.

9. The additive manufacturing system of claim 1, comprising a powder application device disposed within the housing, wherein the flow directing system is integral with the powder application device.

10. The additive manufacturing system of claim 9, comprising a controller operatively coupled to the powder application device, wherein the controller is configured to instruct the powder application device to deposit a bed of powder onto the build platform during successive deposition periods of the powder application device, and instruct the powder application device to transition to a resting position beneath the lower gas inlet between the successive deposition periods of the powder application device.

11. The additive manufacturing system of claim 10, wherein the controller is configured to instruct the one or more gas delivery devices to interrupt the supply of the upper gas flow, the lower gas flow, or both, during each deposition period of the successive deposition periods.

12. An additive manufacturing system, comprising:
a housing defining a chamber;
a build platform disposed in the chamber;
a powder application device configured to translate relative to the build platform and deposit a bed of powder material on the build platform;
an upper gas inlet disposed in a first side wall of the chamber above the build platform, wherein the upper gas inlet is configured to supply an upper gas flow in a first direction parallel to the build platform;
a lower gas inlet in the chamber configured to supply a lower gas flow in a second direction toward the powder application device, wherein the powder application device comprises a flow directing element configured to receive the lower gas flow and redirect the lower gas flow in the first direction parallel to the build platform;
one or more gas delivery devices fluidly coupled to the upper and lower gas inlets and configured to regulate one or more flow characteristics of the upper and lower gas flows; and
a gas outlet disposed in a second side wall of the chamber, wherein the gas outlet is configured to discharge the upper and lower gas flows from the chamber.

13. The additive manufacturing system of claim 12, wherein the flow directing element is removably coupled to the powder application device.

14. The additive manufacturing system of claim 12, wherein the flow directing element is formed integrally with the powder application device.

15. The additive manufacturing system of claim 12, comprising a controller operatively coupled to the powder application device, wherein the controller is configured to:
instruct the powder application device to transition to a resting position between successive deposition periods of the powder application device, wherein the flow directing element is disposed beneath the lower gas inlet in the resting position; and
instruct the one or more gas delivery devices to interrupt supply of the lower gas flow during of the successive deposition periods.

16. The additive manufacturing system of claim 12, comprising an additional flow directing element, separate from the powder application device, disposed above the powder application device, wherein the additional flow directing element is configured to receive the lower gas flow in the second direction and direct the lower gas flow toward the flow directing element in an intermediate direction.

17. The additive manufacturing system of claim 1, further comprising
a plenum dividing wall defining an upper portion of the chamber and a lower portion of the chamber.

* * * * *